FERROELECTRIC COUNTER

Filed Nov. 17, 1953 2 Sheets-Sheet 1

INVENTOR.
DONALD R. YOUNG
HOWARD L. FUNK
BY
William V. Schelberg
AGENT

Feb. 3, 1959 D. R. YOUNG ET AL 2,872,661

FERROELECTRIC COUNTER

Filed Nov. 17, 1953 2 Sheets-Sheet 2

INVENTORS
DONALD R. YOUNG
HOWARD L. FUNK

BY William V. Schelberg
AGENT

United States Patent Office 2,872,661

Patented Feb. 3, 1959

2,872,661

FERROELECTRIC COUNTER

Donald R. Young and Howard L. Funk, Poughkeepsie, N. Y., assignors to International Business Machines Corporation, New York, N. Y., a corporation of New York Application November 17, 1953, Serial No. 392,616

13 Claims. (Cl. 340—173)

This invention relates to a memory system and is directed in particular to a system including a ferroelectric material which is capable of assuming a plurality of stable states of polarization for storage and transfer of information.

Ferroelectric materials are so termed because they exhibit a similarity in certain characteristics to ferromagnetic materials, and a number of such materials are known, such as barium titanate, rochelle salt and potassium niobate. These ferroelectric materials are dielectrics which depend upon internal polarization rather than surface charge for storage. A curve representing dielectric induction plotted versus electric field intensity simulates a hysteresis loop comparable to the B–H curve for a ferromagnetic material.

Memory systems and circuits for handling information are employed throughout accounting equipment for widely different purposes and there has been a trend generally to replace vacuum tube components which perform these functions with other devices which are more reliable, more economical in operation and have longer life as well as occupying less volume.

An object of the present invention is to provide a memory system having a relatively high storage capacity with respect to the size and number of elements comprising the system and which requires no power to maintain the information after storage has been accomplished.

Another object of the invention is to provide a memory system capable of storing information distinguished by a variety of parameters such as magnitude and/or duration of electrical impulses.

Still another object is to provide a system operable to store information presented in the form of electrical impulses and which functions to add or subtract information from that stored in accordance with the manner and form in which such impulses are presented.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a representation of the hysteresis curve for a ferroelectric material such as that employed in the invention.

Fig. 2*a* is a schematic diagram illustrating a basic application of the invention as a counting device.

Figures 2*b*, 2*c* and 2*d* illustrate several circuit arrangements for reading out and/or resetting the counter device shown in Figure 2*a*.

Figure 1:
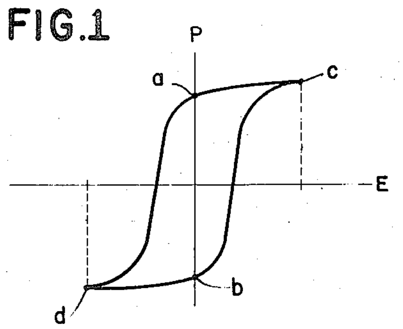

In ferroelectric memory devices such as that to be described, ferroelectric materials having substantially rectangular hysteresis loops and low coercive forces are desirable. The hysteresis loop for a barium titanate crystal of this type is illustrated in Fig. 1 where the vertical axis represents the degree of polarization P of the ferroelectric and the horizontal axis represents the applied electric field strength E. In conventionally representing binary information, the polarization state designed as point "*a*" in the figure is arbitrarily selected as representing storage of a binary one and state "*b*" then is representative of storage of a binary zero. With the ferroelectric capacitor in the binary one state "*a*," on application of a positive pulse greater than the coercive force to its terminals, the hysteresis loop is traversed from state "*a*" to state "*c*" or the saturation point, and, on removal of this applied electric field, returns to point "*a*." The slope of the hysteresis loop traversed is proportional to the capacitance of the ferroelectric crystal and the change in polarization in going from point "*a*" to point "*c*" and return presents a low capacitance to the positive pulse. In storing a binary one in a ferroelectric capacitor which is in the binary zero representing state "*b*," a positive pulse is applied and the hysteresis loop is traversed from the binary zero point "*b*" to point "*c*," and, on termination of the pulse, returns to point "*a*." Application of a negative read out pulse will now cause the capacitor to change from point "*a*" to point "*b*" if the pulse is of sufficient magnitude. In this section of the hysteresis loop, the slope is great and the capacitance of the ferroelectric condenser consequently is high. The points "*a*" and "*b*" on the hysteresis loop are stable states of polarization and represent information stored in the ferroelectric which will be retained for a considerable period of time without requiring any external maintenance energy. At the points "*a*" and "*b*," there is no net field in the ferroelectric condenser or external to it and the polarization charge is equal and opposite to the surface charge. Consequently, conduction through the dielectric does not destroy the information and the external leads may even be shorted together without ill effects.

An electric field applied to the ferroelectric condenser so as to exceed the coercive force, changes the polarization at a rate determined by the magnitude of the current and the total change in polarization is directly proportional to the integral of the applied current over the time of application up to the point of saturation. It has been determined that the electric field need not be applied continuously for this time interval but that this field, which is proportional to the applied voltage, may be intermittently presented to the ferroelectric capacitor in the form of pulses with the total polarization change then being proportional to the number and duration of the individual pulses. The polarization change due to each individual pulse is proportional to the integral of the pulse current wave form and, with the current magnitude and duration held constant, a plurality of pulses may be applied to cause the loop to be traversed from condition "*a*" to condition "*b*" or vice versa. By properly limiting the magnitude and/or duration of the current pulses, any number may theoretically be employed to cause a complete reversal in polarization. The essence of the invention resides in this basic principle and it will be appreciated that a variety of applications of the principle are feasible.

Figure 2A:
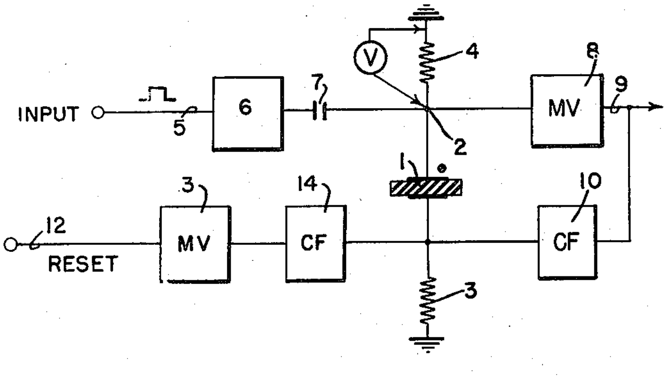

Referring now to Figure 2*a*, which is a schematic illustration of one application of this basic principle, a ferroelectric capacitor 1 comprises the multi-stage storage element. A polarity marking symbol consisting of a dot is shown adjacent one terminal. Positive impulses applied to this terminal of the condenser 1 cause a shift in the polarization state in a direction from point "*b*" to point "*a*," while negative impulses applied to the same terminal cause a shift in the direction of polarization from point "*a*" to point "*b*." Pulses of opposite polarity applied to the unmarked terminal of the condenser 1 cause corresponding shifts in the direction of polarization.

The "dot" side of ferroelectric capacitor 1 is connected to a junction 2 and the unmarked terminal is connected to ground through a resistor 3. Junction 2 is also grounded through a resistor 4 in order to prevent direct current build-up at this circuit terminal. Input pulses to be counted are applied to a lead 5 and, for purposes of the present explanation are of positive polarity. Lead 5 is coupled to the input of a pulse shaper and limiter circuit network 6 shown in block form with the legend PFN as conventionally used to designate pulse forming networks. The output lead from this component is coupled to one terminal of a standard capacitor 7 and the other terminal of the latter is connected to the junction 2. This junction point is also connected to the input of a single shot multivibrator 8 and an output lead 9 from the multivibrator is coupled to the common terminal of the ferroelectric capacitor 1 and the resistor 3 through a cathode follower circuit 10. In order to establish a reference polarization state and to provide for read out, positive pulses are applied to the unmarked terminal of capacitor 1 through a lead 12, a further single shot multivibrator 13 and cathode follower 14. Each of the circuit components 6, 8, 10, 13 and 14 are illustrated in block form as these devices are conventional in the art and, per se, form no part of the present invention.

As positive input pulses are applied to lead 5 and are presented to the pulse shaper and limiter circuit 6, the amplitude and duration of the pulses are standardized so that proper increments of electric field are applied to the system. The duration and amplitude of these pulses are so regulated that a predetermined number causes a complete reversal of the state of polarization of the ferroelectric capacitor as heretofore mentioned.

In describing the operation of the illustrated circuit, it may be assumed that the ferroelectric storage element 1 is placed in an initial polarization state "*b*" representing a binary zero (see Fig. 1) by application of a single reset pulse of positive polarity applied to the lead 12. The input pulses to be counted are quantified so that *n* increments or *n* individual pulses are required to cause a complete reversal in polarization from point "*b*" to point "*a*." The input pulses are positive, as heretofore mentioned, and are applied through the condenser 7 and terminal 2 to the dot marked side of the ferroelectric storage condenser.

The ferroelectric capacitor charges to a first degree and the voltage drop developed by the first input pulse appears principally across the resistor 3. Insufficient voltage is developed at junction 2 at this time to cause the single shot multivibrator 8 to function. The net change in the state of polarization of the ferroelectric condenser 1 each time a pulse is applied, is directly proportional to the integral of the quantified input pulse, and the polarization state is moved in the direction of saturation opposite in sense to the limiting initial state "*b*." A pulse which may be designated as the *n*—1th pulse will produce dynamic polarization of the ferroelectric condenser 1 in the sense opposite to that produced initially, point "*b*" on the hysteresis curve. At this time, the storage condenser 1 can accept no further charge and a low capacitance is presented to further input pulses. When the *n*th pulse is applied, sufficient voltage appears at terminal 2 to trigger the multivibrator 8 and produce a single output pulse on lead 9. The cathode follower 10, which is coupled to lead 9, is now rendered conductive for the duration of the output pulse from the multivibrator and a pulse of positive polarity is applied to the negative or unmarked side of the ferroelectric condenser 1. This pulse is regulated in duration and amplitude so as to provide a sufficient electric field to cause the ferroelectric condenser 1 to be reset from point "*a*" to the initial binary zero representing state "*b*." The output of the system appearing on lead 9 may be directed to another unit operable to count one for each group of *n* input pulses applied and still further units, coupled in like manner, may be provided to form a counter capable of accumulating digits of any desired magnitude. It will be obvious, however, that each unit may individually count any number of pulses *n* within the limits of the ability of the several components to distinguish between increments of quantified pulses.

The configuration in Figure 2*a* describes the basic elements necessary for a counting device using the invention. Means are shown and described for applying quantified pulses to the ferroelectric capacitor and for resetting it to a previously defined "zero" state. It will be observed that by varying the polarity of the quantified input pulses applied to the unit that both addition and subtraction may be accomplished. Considering a capacitor which is polarized at some degree between the two limiting states by positive pulses, a negative pulse or pulses applied to the "dot" marked terminal will step the polarization downwardly or toward the initial state "*b*" in equal increments. Subtraction and addition may also be accomplished by applying positive pulses to both terminals selectively since a positive pulse applied to the unmarked terminal produces an equivalent change in polarization to a negative pulse applied to the dot marked terminal.

In the preceding discussion it is seen that the circuit of Figure 2*a* delivers an output pulse to the lead 9 upon application of each group of *n* input pulses to the multistate ferroelectric capacitor 1 and simultaneously resets the capacitor to the initial state. With a number of input pulses applied either less than *n* or in excess of a multiple of *n*, the capacitor 1 remains at some intermediate polarization state between points "*b*" and "*a*." This intermediate value can be determined in several ways. As shown in Figure 2*a*, read out may be accomplished by resetting the capacitor to its initial state by pulsing the lead 12 positively and observing the amount of current or voltage developed across a series connected resistor such as element 4 by a meter V.

Figure 2B:
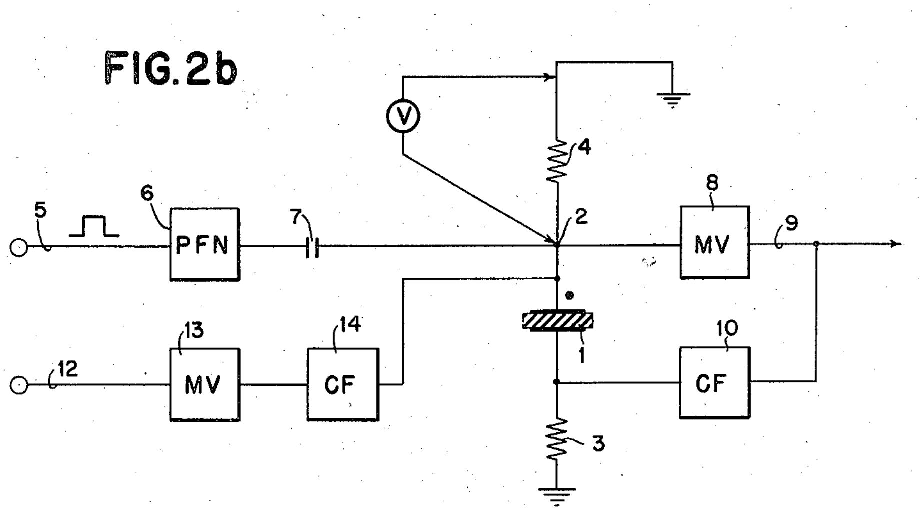

As shown in Figure 2*b*, the single quantified read out pulse may be applied to the "dot" marked capacitor terminal in continuing to polarize the capacitor 1 away from the initial state or previously defined zero and thus obtaining an indication of the complement of the value stored.

With the polarity of the read out pulses reversed, the arrangement of Figure 2*a* develops a complement reading while that of Figure 2*b* develops a true reading by the magnitude of voltage indicated by meter V.

Figure 2C:
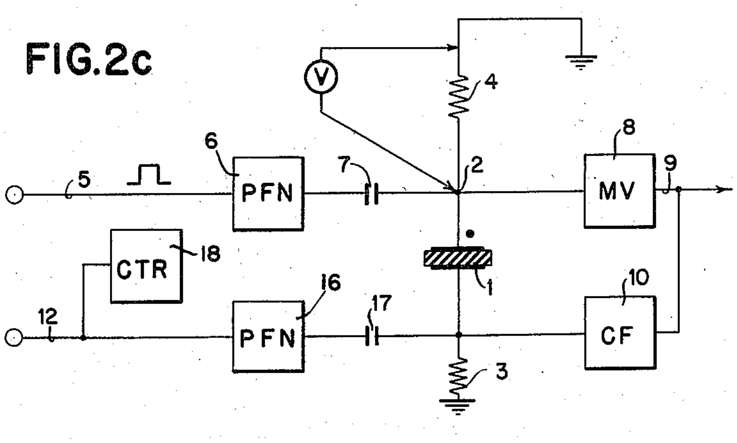

Both the arrangement of Figure 2*a* and that of Figure 2*b* employ a single quantified read out pulse, however, the readout and reset function may be accomplished by a series of quantified increment pulses rather than a large single pulse. Such an arrangement is shown in Figure 2*c* with read out pulse increments applied through a quantifier network 16 and capacitor 17 similar to elements 6 and 7, aforementioned, and counted by a counter device 18 of any conventional type. With positive pulses applied to the unmarked terminal of condenser 1, polarization is again toward state "*b*" and, by observing the count of pulses applied when a reading is obtained on the meter V, the true stored value is indicated.

Figure 2D:
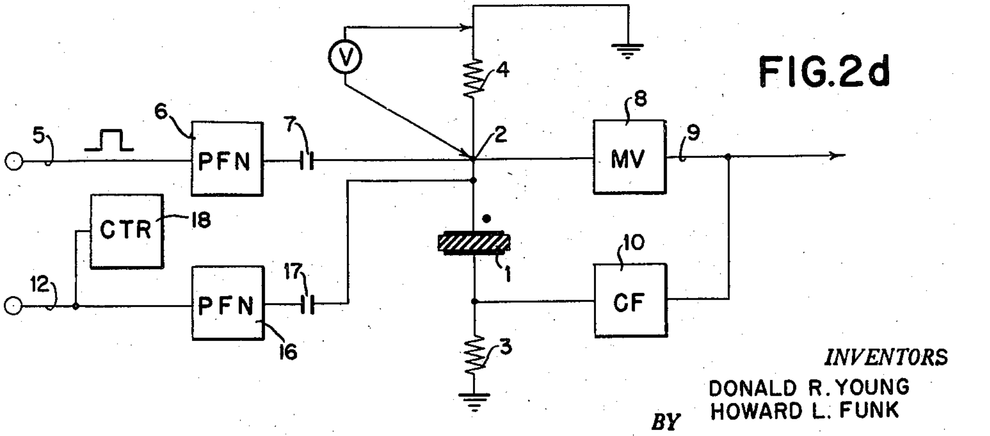

As shown in Figure 2*d*, positive incremental pulses may be applied to the dot marked capacitor terminal through the quantifier network 16, with the ferroelectric capacitor 1 now driven away from the initial state "*b*." In this case the complement of the stored value is indicated by the counter 18 when a voltage is developed across the resistor 4 as indicated by the meter V or when the multivibrator 8 is caused to function.

Again, with the polarity of the read out pulses reversed, the arrangement of Figure 2*c* provides a complement reading while that of Figure 2*d* provides a true value reading.

Figure 3:
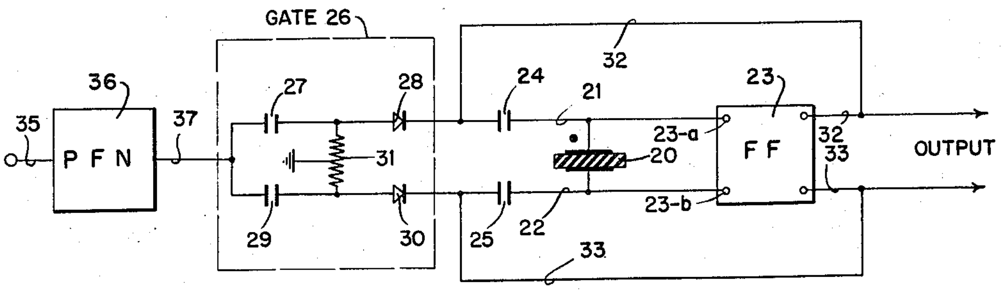
Fig. 3 is an illustration of a further modification of the invention as applied to a counter device.

The embodiment illustrated in Figure 3 employs an arrangement for incremental application of count pulses utilizing both directions of polarization for counting. Such an arrangement does not require resetting to one of the limiting states of polarization at the conclusion of each group of $n$ impulses but automatically reverses the application of the quantified impulses from one to the other condenser terminal. This feature is somewhat similar to one of the above described read-out methods.

The ferroelectric capacitor 20 shown in Figure 3 is connected between two conductors 21 and 22 which, at one set of terminals, provide input connections to a flip-flop circuit 23 of conventional design. The other set of terminals of the leads 21 and 22 are connected through individual standard type capacitors 24 and 25 respectively to a gate circuit 26. The gate 26 comprises a first standard capacitor 27 and series connected diode 28 and a second standard capacitor 29 and series diode 30 with the junction of the two series connected elements coupled through a resistor 31, the mid-point of which is grounded. The cathode of diode 28 is coupled to the line 21 by capacitor 24 and to one output terminal of the flip-flop unit 23 by a lead 32 while the cathode of diode 30 is connected to line 22 by capacitor 25 and the other output of flip-flop 23 by a lead 33. Input pulses are supplied via a lead 35 to a pulse forming network or pulse shaper and limiter circuit 36 similar to the circuit 6 described in connection with Fig. 2*a*. The output of the circuit 36 is a quantified pulse and is applied on a lead 37 which connects with both the aforementioned capacitors 27 and 29.

The flip-flop circuit 23 is of conventional design and is shown in block diagram form with the legend FF as it constitutes no part of the present invention per se and need be but briefly described here for an understanding of the invention. Triggers or flip flops conventionally include two vacuum tubes so interconnected that when one is conductive the other is cut off. The network will remain in either of the conductive states stably until a controlling pulse is applied to reverse the conductive status of the tubes. Voltages at points in the trigger circuit differ according to whether the tubes are in one or the other relative conducting status and provide output potentials usable for control purposes. With the plate potential supply for the trigger tubes positive with respect to ground and their cathodes connected to a source negative with respect to ground, the two conventional output terminals may be made to alternately assume positive and negative potentials in response to input pulses successively applied to the tube grids.

Assuming flip-flop 23 to be in a first state of equilibrium, lead 32 may be negative and lead 33 positive. Considering the storage capacitor 20 as initially in a zero representing state of polarization or at point "*b*" on its hysteresis curve, then positive count pulses applied to the dot marked terminal will cause progressive shifts in incremental steps toward the limiting state "*a*."

With the initial state of ferroelectric capacitor 20 and flip-flop 23 established, an input pulse applied to lead 35 appears as a positive quantified impulse on lead 37 having had its amplitude and duration standardized by the shaper and limiter network 36. Lead 33 is at a positive potential blocking conductivity of diode 30 so that the positive impulse passes capacitor 27 and diode 28 of the gate 26 and is applied to lead 21 and the dot marked capacitor terminal. As the storage condenser 20 cannot charge instantaneously, the voltage developed across the input terminals of the flip flop 23 is insufficient to cause operation. The $n$—1th input polarizes the condenser 20 to state "*a*" and the 23–*a* input to the flip flop 23, on application of the $n$th pulse, is then pulsed positively causing operation and an output pulse is produced on lead 33. As in the embodiments shown in Figures 2*a*–2*d*, this output may be directed to other similar units which may count one for each group of $n$ input pulses applied, etc., to form an accumulator. The voltage levels appearing on leads 32 and 33 are applied to the gate 26 and cause succeeding input pulses to be directed through the gate to lead 22 by blocking the diode 28. Positive quantified input pulses are now applied to the unmarked terminal of condenser 20 through the diode 30 and standard condenser 25 and incremental stepping of the polarization continues, but in a direction away from state "*a*" and toward state "*b*." On application of the 2$n$th pulse, an operation of the flip-flop 23 is again obtained and the gate 26 is in turn activated so that input pulses are applied there through to conductor 21 once more and the operating cycle is repeated.

The input pulses applied to the gate 26, as shown in Figure 3, are quantified prior to their direction to line 37. This function may be accomplished by means of a conventional pulse shaper and limiter such as that illustrated as element 36, element 6 as shown in Figure 2*a* or element 16 as shown in Figures 2*c* and 2*d* or further, by a novel ferroelectric quantifier such as that to be described in connection with Figure 4. It is to be noted also that the conventional PFN circuits 6 and 16 for quantifying the pulses in Figures 2*a*, 2*b*, 2*c* and 2*d* may also be replaced by this ferroelectric device.

Figure 4:
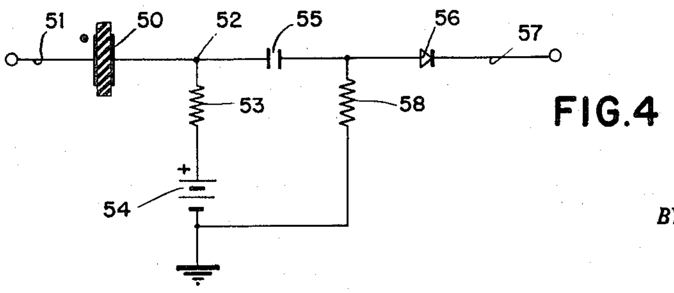
Fig. 4 is an illustration of a ferroelectric pulse quantifier device.

Referring now to Figure 4, a ferroelectric capacitor 50 is connected at one terminal to a source of count pulses (not shown) through a lead 51. The opposite terminal of condenser 50 is connected to a terminal 52 and through a resistor 53 to a battery 54, the negative terminal of which is grounded. Junction 52 is also connected through a standard condenser 55 and diode 56 to an output lead 57. A resistor 58 may be connected between the junction of elements 55 and 56 and is grounded to provide direct current isolation.

Due to the steady state bias of battery 54 applied to the unmarked terminal of condenser 50 through the resistor 53, the ferroelectric condenser 50 is normally in a polarization state represented as point "*d*" on the hysteresis curve. Positive count pulses of sufficient magnitude are applied to terminal 51 and drive the ferroelectric capacitor 50 to the polarization state "*c*." At the termination of this input pulse, current flows through the resistor 53 and recharges condenser 50 in its opposite limiting sense. At this time, a predetermined quantified pulse is developed due to the simultaneous flow of electrons from the condenser 55 toward terminal 52. This positive quantified pulse passes diode 56 and appears at lead 57 which may be connected to the input of either of the aforementioned counter devices.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A memory device comprising a ferroelectric capacitor having a plurality of stable states of polarization between two limits, means for polarizing said ferroelectric condenser to one limiting state of polarization, means for polarizing said ferroelectric condenser in a direction opposed to said one limiting state, and means for producing an indication of the change necessary to return said ferroelectric condenser to said one limiting state.

2. A memory system comprising a ferroelectric capacitor having a plurality of stable states of polarization between two limits, means for changing the polarization from a limiting state of one polarity in a direction toward the limiting state of the opposite polarity, means for returning said ferroelectric capacitor from said changed polarity state back to its limiting state of one polarity and means for producing an indication of the change necessary to return said condenser to said limiting state of one polarity.

3. A memory system comprising, in combination, a ferroelectric capacitor capable of assuming a multiplicity of stable states of polarization between two limiting states, means for polarizing said ferroelectric condenser to one of said limiting states, means for applying quantified pulses of a polarity such as to polarize said condenser in a sense opposed to said one limiting state, and means for indicating polarization of said condenser in the other limiting state and for resetting said ferroelectric condenser to said one limiting state.

4. A memory system of the character described comprising a ferroelectric condenser, reset means for impressing a voltage of sufficient magnitude and duration to terminals of said condneser so as to cause polarization in one direction to a limiting state, means for impressing a series of quantified voltage pulses to said terminals in a sense to cause polarization in the opposite direction, said means for impressing a quantified voltage comprising a conventional type condenser coupled to one terminal of said ferroelectric condenser, and output means coupled to the junction of said condensers and to said reset means.

5. A memory system of the character described comprising a ferroelectric condenser capable of assuming a multiplicity of stable states of polarization intermediate two limits of opposite polarities, input means for impressing a series of quantified pulses to said ferroelectric condenser to thereby change its state of polarization from a limiting state of one polarity in intermediate steps toward a limiting state of opposite polarity, output means coupled with said ferroelectric capacitor for obtaining an output on receipt of a predetermined number of said quantified pulses, and automatic reset means for producing a reset pulse sufficient to return said ferroelectric condenser to its initial limiting state of polarization, said output means actuating said reset means upon receipt of the next pulse following polarization of said ferroelectric condenser to the limiting state opposite in polarity to said initial limiting state of polarization.

6. A memory system of the character described comprising a ferroelectric capacitor capable of assuming stable states of polarization between two limits, means for polarizing said capacitor to an intermediate state between said limits, and means for obtaining an indication of the intermediate state of polarization of the capacitor with respect to one of said limits.

7. A memory system of the character described comprising a ferroelectric capacitor having a hysteresis loop characteristic, means for polarizing said ferroelectric capacitor to a state between two limits of polarization defined by said loop and means for determining the state of polarization when said state is between said two limits.

8. A memory device comprising a ferroelectric capacitor capable of assuming a plurality of stable states of polarization between two limits, means for polarizing said capacitor in incremental steps from one toward the other of said limits, and means for indicating attainment of said other limit.

9. A memory system of the character described comprising a ferroelectric condenser, reset means for impressing a voltage of sufficient magnitude and duration to terminals of said condenser so as to cause polarization in one direction to a limiting state, means for polarizing said condenser in incremental steps in the other direction in storing information representations, the storage capacity for said representations being determined by the number of incremental steps intermediate limiting polarization states in opposed directions, and means for determining the number of representations stored in said ferroelectric condenser.

10. A memory device according to claim 8 wherein said means for polarizing said capacitor in incremental steps comprises a source of quantified input pulses.

11. A memory device according to claim 8 wherein said means for indicating attainment of said other limit includes means for applying quantified pulses.

12. A memory system according to claim 9 wherein said means for determining the number of representations stored in said ferroelectric condenser comprises means for producing a series of quantified pulses and means for counting said pulses.

13. A memory system according to claim 9 wherein said means for determining the number of representations stored in said ferroelectric condenser comprises means for applying a series of quantified pulses of a polarity such as to continue polarization toward said other direction.

References Cited in the file of this patent

UNITED STATES PATENTS

| | | |
|---|---|---|
| 2,666,195 | Bachelet | Jan. 12, 1954 |
| 2,695,396 | Anderson | Nov. 23, 1954 |
| 2,695,398 | Anderson | Nov. 23, 1954 |
| 2,717,372 | Anderson | Sept. 6, 1955 |

FOREIGN PATENTS

| | | |
|---|---|---|
| 890,375 | Germany | Sept. 17, 1953 |

OTHER REFERENCES

The Snapping Dipoles of Ferro Electrics as a Memory Element for Digital Computers (June 1953), pp. 145–150 and Figs. 1, 5, 6, 8, pp. 155–158.

"Multi-Stable Magnetic Memory Techniques" (Goodell), Radio-Electronic Engineering, December 1951.